(12) United States Patent
Verma et al.

(10) Patent No.: US 7,739,244 B2
(45) Date of Patent: Jun. 15, 2010

(54) OPERATING LOGGING FOR ONLINE RECOVERY IN SHARED MEMORY INFORMATION SYSTEMS

(75) Inventors: Sanjay Verma, Foster City, CA (US);
Chi-Kim Hoang, Palo Alto, CA (US);
Mark Lawrence McAuliffe, Palo Alto, CA (US); Kirk Meredith Edson, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 368 days.

(21) Appl. No.: 10/966,285

(22) Filed: Oct. 14, 2004

(65) Prior Publication Data
US 2006/0085426 A1 Apr. 20, 2006

(51) Int. Cl.
*G06F 17/30* (2006.01)
(52) U.S. Cl. .......................... 707/684; 707/685; 714/19
(58) Field of Classification Search ............. 707/103 R, 707/1, 2, 202; 705/34; 709/226; 714/2
See application file for complete search history.

(56) References Cited

U.S. PATENT DOCUMENTS

| | | |
|---|---|---|
| 4,627,019 A | 12/1986 | Ng |
| 4,875,159 A | 10/1989 | Cary et al. |
| 5,170,480 A | 12/1992 | Mohan et al. |
| 5,280,612 A | 1/1994 | Lorie et al. |
| 5,287,496 A | 2/1994 | Chen et al. |
| 5,313,629 A | 5/1994 | Abraham et al. |
| 5,390,316 A | 2/1995 | Cramer et al. |
| 5,410,697 A | 4/1995 | Baird et al. |
| 5,423,037 A | 6/1995 | Hvasshovd |
| 5,440,727 A | 8/1995 | Bhide et al. |
| 5,452,445 A | 9/1995 | Hallmark et al. |
| 5,485,607 A | 1/1996 | Lomet et al. |
| 5,497,483 A | 3/1996 | Beardsley et al. |
| 5,555,404 A | 9/1996 | Torbjornsen et al. |
| 5,577,240 A | 11/1996 | Demers et al. |
| 5,586,310 A | 12/1996 | Sharman |
| 5,621,795 A | 4/1997 | Baker et al. |
| 5,701,480 A | 12/1997 | Raz |
| 5,708,812 A | 1/1998 | Van Dyke et al. |
| 5,737,601 A | 4/1998 | Jain et al. |
| 5,758,337 A | 5/1998 | Hammond |
| 5,781,910 A | 7/1998 | Gostanian et al. |
| 5,796,999 A | 8/1998 | Azagury et al. |

(Continued)

OTHER PUBLICATIONS

King et al. "Management of a Remote Backup for Disaster Recovery", Jun. 1991, ACM Transactions on Database Systems, vol. 16, No. 2, pp. 338-368.*

(Continued)

*Primary Examiner*—Cheyne D Ly
*Assistant Examiner*—Jau-Shya Meng
(74) *Attorney, Agent, or Firm*—Stolowitz Ford Cowger LLP

(57) ABSTRACT

Clients are permitted to directly attach to a client server system. An oplog management system tracks changes as clients make the changes to control structures of the direct connection client server system. The Oplogging system stores changes in oplogs. Then, if a client fails, the Oplogging system can repair the control structures, either by undoing the changes made by the client, or else completing the changes in place of the client; depending upon principles defined.

43 Claims, 10 Drawing Sheets

U.S. PATENT DOCUMENTS

| | | | |
|---|---|---|---|
| 5,806,075 | A | 9/1998 | Jain et al. |
| 5,809,503 | A | 9/1998 | Aoshima |
| 5,852,715 | A | 12/1998 | Raz et al. |
| 5,870,758 | A | 2/1999 | Bamford et al. |
| 5,884,297 | A * | 3/1999 | Noven .......................... 707/2 |
| 5,923,833 | A | 7/1999 | Freund et al. |
| 5,974,427 | A | 10/1999 | Reiter |
| 6,009,425 | A | 12/1999 | Mohan |
| 6,058,389 | A * | 5/2000 | Chandra et al. ................ 707/1 |
| 6,122,645 | A | 9/2000 | Bohannon et al. |
| 6,157,927 | A * | 12/2000 | Schaefer et al. ......... 707/103 R |
| 6,233,585 | B1 | 5/2001 | Gupta et al. |
| 6,295,610 | B1 | 9/2001 | Ganesh et al. |
| 6,341,288 | B1 * | 1/2002 | Yach et al. ............. 707/103 R |
| 6,351,753 | B1 | 2/2002 | Jagadish et al. |
| 6,502,133 | B1 | 12/2002 | Baulier et al. |
| 6,631,478 | B1 | 10/2003 | Wang et al. |
| 6,647,510 | B1 | 11/2003 | Ganesh et al. |
| 6,862,622 | B2 * | 3/2005 | Jorgensen ................... 709/226 |
| 7,236,956 | B1 * | 6/2007 | Ogg et al. ..................... 705/50 |
| 2001/0009002 | A1 * | 7/2001 | Logan et al. ................. 705/34 |
| 2002/0095403 | A1 * | 7/2002 | Chandrasekaran et al. ..... 707/1 |
| 2002/0156719 | A1 * | 10/2002 | Finebaum et al. ............. 705/37 |
| 2003/0078910 | A1 | 4/2003 | Kenai et al. |
| 2003/0200212 | A1 | 10/2003 | Benson et al. |
| 2004/0015642 | A1 | 1/2004 | Moir et al. |
| 2004/0139116 | A1 | 7/2004 | Porter |
| 2004/0205066 | A1 | 10/2004 | Bhattacharjee et al. |
| 2004/0220933 | A1 | 11/2004 | Walker |
| 2004/0267747 | A1 | 12/2004 | Choi et al. |
| 2006/0047525 | A1 * | 3/2006 | Ziv et al. ....................... 705/1 |

OTHER PUBLICATIONS

U.S. Appl. No. 09/796,708, filed Aug. 2002, Gagne, Mathieu.*
U.S. Appl. No. 08/700,487, filed Nov. 1999, Falls et al.*
U.S. Appl. No. 09/579,428, filed Mar. 2005, Scott et al.*
Bernstein, P.A., et al., "Concurrency Control and Recovery in Database Systems; Multiversion Concurrency Control," Concurrency Control and Recovery in Database Systems, Addison-Wesley, pp. 143-166, 1987.
Anonymous, "Bonus C for Dummies Lesson 17-6—Sorting a Structure," Internet Article, Online! 2002, pp. 1-3. www.c-for-dummies.com/lessons/chapter.17/06. Retrieved on Dec. 21, 2004.
Mohan, C., et al., "Efficient and Flexible Methods for Transient Versioning of Records to Avoid Locking by Read-Only Transaction," Proceedings of the ACM SIGMOD International Conference on Management of Data, pp. 124-133, San Diego, Jun. 2-5, 1992.
Greenwald et al., "Oracle Essentials: Oracle 8 & Oracle 8i—Chapter 7, Multiuser Concurrency," Internet article, Online! Oct. 1999, pp. 1-7. www.cs.wisc.edu/{cs764-1/oracle.locking.html. Retrieved on Dec. 23, 2004.
Molesky et al. "Recovery Protocols for Shared memory Database Systems"; Association of Computing Machinery; 1995; pp. 11-22.
Agrawal, D, Krishnaswamy, V. "Using multiversioning data for non-interfering execution of write-only transactions", SIGMOD Conference 91, 98-107.
Ahuja, M., Browne, J., "Performance Evaluation of Two Concurrency control Protocols for distributed data bases with multiversioned entities", IEEE 1988, 426-436.
Bayer, R., Heller H., Reiser, A. ,"Parallelism and Recovery in Database", Transactions on Database Systems, vol. 5, No. 2, pp. 139-156, Jun. 1980.
Bernstein, P. and Goodman, N., "Multiversion Concurrency Control—Theory and Algorithms", ACM Transactions and Database Systems, vol. 8, No. 4, pp. 465-483, Dec. 1983.
Berenson, et al., A critique of ANSI SQL Isolation Levels, SIGMOD, San Jose, California 1995.
Bober, P., Carey, M. "On Mixing Queries and Transactions via Multiversion Locking", ICDE Madison, Wisconsin, 1992: 535-545.
Bober, P., Carey, M., "Indexing for multiversion locking: alternatives an performance evaluation", IEEE Transactions on Knowledge and Data Engineering, vol. 9, No. 1, Jan.-Feb. 1997.
Chan, A. et al, "The Implementation of an Integrated Concurrency Control and Recovery Scheme", Proceedings of the Association for Computing Machinery SIGMOD International Conference on Management of Date, Orlando, Florida, Jun. 1982.
Lomet, D., MLR: A Recovery Method for Multi-level systems, ACM SIGMOS 1992.
Kempster, T. et al., Diluting Acid, SIGMOD Record, vol. 28, No. 4, Dec. 1999.
Lamport, L., On Interprocess Communication. Part I: Basic Formalism and Part II: Algorithms, Distributed Computing 1 (2): 77-101, 1986.
Lomet, D., et al. "Access methods for multiversion data", D. Lomet, B. Salzberg, SIGMOD Conference 1989; 315-324.
Mohan, C., "Commit_LSN: A novel and simple method for reducing locking and latching in transaction processing systems", 16th VLDB Conference (Brisbane, Australia), Aug. 1990.
Mohan,C., Pirahesh, H., Lorie, R., "Efficient Flexible Methods for Transient Versioning of records to avoid locking by read-only transactions", ACM SIGMOD 1992.
Oracle 9i Database concepts, Chapter 22, Date Concurrency and Consistency, on-line documentation at http://doc.oracle.com, Jul. 2001.
Bober, P., Carey, M., "Multiversion Query Locking", P. Bober, M. Carey, Proceedings of the 18th VLDB Conference (Vancouver, British Columbia, Canada) 1992.
Reed, D., PhD Thesis, "Naming and Synchronization in a Decentralized Computer System", Technical Report MIT/LCSTR-205, Massachusettes Institute of Technology, pp. 1-181, Sep. 1978.
Robinson, J. et al., "Elimination of Lock Contention and Relational Databases Accessed by Read-Only Queries and On-Line Update Transactions", IBM Technical Disclosure Bulletin, pp. 180-185, Jun. 1988.
Stearns, Richard E. et al., "Distributed Database Concurrency Controls Using Before-Values", Proceedings of the Association for Computing Machinery SIGMOD International Conference on management of Data, Ann Arbor, Michigan, pp. 74-83, Apr. 1981.
"Times-Ten Team: In-Memory Data Management for Consumer Transactions The Times Then Approach", SIGMOD conference, Philadelphia, PA, pp. 528-529, 1999.
Weikum, G., A theoretical foundation of multi-level concurrency control, Proc. Of ACM PODS Conf., Mar. 1986.
Weikum G., Principles and realizations strategies of multilevel transaction management, ACM Transactions and Database Systems, vol. 16, No. 1, pp. 132-180, Mar. 1991.
Mohan, C., "ARIES/KVL: A Key-Value Locking Method for Concurrency Control of Multiaction Transactions Operating on B-Tree Indexes," Proceedings of 16th VLDB Conference, Brisbane, Australia, Aug. 1990, pp. 392-405.
Mohan, C.et al., "ARIES/IM: An Efficient and High Concurrency Index Management Method Using Write-Ahead Logging," 1992 ACM SIGMOD, California, Jun. 1992, pp. 371-380.
Molesky, et al. "Recovery Protocols for Shared Memory Database Systems"; Association of Computing Machinery; 1995; pp. 11-22.
Neves, et al. "A Checkpoint Protocol for an Entry Consistent Shared Memory System"; 13th ACM Symposium on Principles of Distributed Computing; Aug. 1994; pp. 1-9.

* cited by examiner

OPEN CURSOR EXAMPLE

SUBSET OF CONTROL DATA AND MANAGED DATA

INITIAL STATE OF CURSOR. TRANSACTION AND TABLE CONTROL DATA

OPLOG

CRITICALSECTIONID: 1
STEPNUMER: 2
XACT: 8121
CURSOR: 8111
TABLE: 8131
COUNT: 0

FINAL STATE

TRANSFER OF ELEMENTS BETWEEN LINKED LISTS EXAMPLE

DO THE LOOP EXAMPLE

INITIAL STATE

OPLOG

CRITICALSECTIONID: 3
STEPNUMER: 1
NODE: 8151
LENGTH: 4
HOLE: 81513

823

FINAL STATE

MOVE HOLE

MH.1 hole = 81513
MH.2 while hole <= 81511 + LENGTH
MH.3 [
MH.4    log 823.hole = hole
MH.5    node 8151.val(hole) = node 8151. val(hole + 1)
MH.6    hole = hole + 1
MH.7 ]

Critical Section and Oplog

Complex Critical Section and Oplog

Nested Critical Section and Oplog

OPERATING LOGGING FOR ONLINE RECOVERY IN SHARED MEMORY INFORMATION SYSTEMS

FIELD OF INVENTION

The invention relates to the field of recovery in client server systems. Specifically, the invention relates to those architectures where client processes are directly connected to server process. More specifically, the invention relates to the ability to maintain availability of a server sub-system to existing and new clients in the presence of failure of one or more client processes that are directly connected to the server sub-system.

BACKGROUND OF INVENTION

A common architecture for computer applications is the client-server architecture. Client-server applications are computer systems where functionality of the application is divided across the server and the clients. For example, the client may provide a user interface and the server may provide access to shared resources. Typically the clients and the server execute as separate process. The clients request the server process to perform actions on their behalf i.e. the clients access shared resources via the server. The server manages the shared resources, and these resources may be termed managed data. To facilitate the execution of actions (on behalf of clients) the server needs to maintain control data to manage the execution of those actions. Example of control data is information to control concurrency, permissions, and access to the managed data etc. Typically, control data is transient and is reinitialized at system start; however parts of control data can be persistent. In summary, the data manipulated by a server in a client-server system may be divided into two parts: managed data, and control data.

A common example of a server used in client-server architectures is a database management system (DBMS). A database is a collection of data items stored in a computer—these data items constitute the managed data in a database management system (DBMS) setting. Multiple users may concurrently access these (managed) data items via clients. The actions that are run on behalf of the clients are called transactions. Transactions may read from the database, write (insert, delete, or update) to the database or both, thus transactions may be made up of many read and write operations. Transactions can not only cause the modification of data items, but also the modification of control data that the DBMS maintains internally to control execution and provide access to the underlying data items. We will frequently provide examples from DBMS. However, it should be noted that the invention presented here has wide applicability and DBMS is only one example application.

Those skilled in the art will recognize that atomicity is a desired behavior of any mission critical client-server system. Atomicity refers to the property that any client request is either fully executed or not executed at all, in other words, either all effects of an action that the client requested are visible to other clients or none of the effects is visible. One example of a client-server system where atomicity is highly desired is a DBMS. Either all effects of a transaction should be visible to other transactions or none of the effects should be visible (this is part of ACID (Atomicity, Concurrency, Isolation, and Durability) properties of transactions). Client requests have intentional direct effect on managed data. However, control data is changed indirectly. It is changed by the server process running on behalf of the client. Typically the property of atomicity is associated with managed data, and not control data.

In the art, the techniques to implement atomicity for managed data via logging and recovery are well understood. Write Ahead Logging (WAL) is a well-known example of logging. In this scheme, log records are created to track the changes made to the managed data. The log records include the old copy of managed data as well as the new copy. They also record the beginning and end of client actions. WAL guarantees that log records are persisted to a non-volatile storage medium, such as a disk, prior to persisting the actual managed data. Thus, in case of any failure, the server uses the log records that have been persisted to determine whether a given client action was partially completed or fully completed. The effect of partially completed client action is undone by using the old copy of managed data saved in log records to roll back the state of the managed data to the state it had prior to starting the client action. Similarly, the new copy of managed data saved in log records is used to roll forward the state of the managed data to reflect the changes made by fully completed client actions. In this manner, the server guarantees atomicity of client actions on managed data even in the presence of failures. Rollback and roll-forward together help achieve atomicity in a system.

Just as atomicity is a correctness condition for managed data, consistency is a correctness condition for control data. We define a consistent state for the control data as any state in which the control data is not being modified by a client action. Note that at the end of rollback, the control data is, by definition, in a consistent state. When a client action is performed, it may lead to changes in control data, including, but not limited to, access control information, managed data metadata, concurrency control information, etc. In the presence of client failures, the control data needs to be in a consistent state before the server can successfully rollback the effects of the client actions that were being performed on the managed data.

We define recovery as the process of bringing both the control and managed data to a correct state. That is, recovery involves bringing the control data to a consistent state and maintaining atomicity for the managed data.

Traditionally, in client-server systems such as a DBMS, client requests are executed in a server process separate from the client process itself, and client processes connect to the server via inter-process communication mechanisms such as messages. These configurations are called indirect connections. Such configurations are highly resilient to errors in the clients. Specifically, if a client process dies or exits, the server detects the failure through the lack of communication with the client, cleans up any control data that may have been modified on behalf of the failed client process to reach a consistent state for the control data, and rolls back all incomplete actions being executed on behalf of the failed client process. The crucial benefit of traditional indirect connections is that the failure of a client process cannot interrupt changes that the server makes to its control data. Thus the failure of a client process cannot result in partially modified control data. For example, a typical change in control data can be an insertion into a linked list. With indirect connections, the act of modifying the linked list will not halt in the middle of the change; rather, it will halt before or after insertion, when the control data is in a consistent state. That the act of modifying the linked list will not halt midstream is because the server will check if the client is dead only at these discrete points; if the client is dead, the server can take further action. In essence, the server process is free to act upon the client failure when it is convenient for it, i.e., when the control data is in a consistent state.

While inter-process communication between client processes and a server process insulates the server process from client failures, it does add a significant performance overhead to each client request. This overhead is undesirable in high performance environments, and is particularly unacceptable for an in-memory DBMS. An in-memory DBMS is a state-of-the-art DBMS that has been designed to fully exploit 64-bit processors, and inexpensive and plentiful main memory to deliver very high performance. In such a system, all data items of a database are in main memory at run time, instead of being on non-volatile memory such as disk.

A common solution for overcoming the overhead of inter-process communication is for some server functionality to be packaged as an executable library that can be linked with the client application, and for the client application and for that part of the server to execute in a single process. We call this configuration a direct connection, and we call the combined client application and server library a direct connection client server system. Since there is typically a multitude of clients in a client-server application, it is typical to maintain control data and some or all of managed data in a shared memory segment.

In such an environment, the failure of a client process can interrupt the execution of a client action. The consequences of such a client failure include both the managed data and control data potentially in inconsistent states. For example, consider again a client modifying a linked list in the control data. In the direct connection model, the client may die or exit in the middle of making the change to the linked list. Thus, the linked list may be left in a circular state, may be truncated, or may be left in some other inconsistent state. If the server tries to rollback from an inconsistent state it may get stuck in an infinite loop, may leak memory, or may crash. Thus, the fact that the control data might be in a consistent state creates a problem for the server attempting to roll back changes made to the managed data by the failed client.

The problem of dealing with changes to control data by directly connected clients is well recognized in the literature. One solution to this problem is to declare all client connections to the server invalid whenever an unexpected failure occurs in a directly connected client process while it is in the middle of modifying control data. Sometimes critical sections are used to declare such regions that modify control data. These regions may vary in granularity; a simple application of this technique is to declare the whole server executable library a critical section. The server is not capable of bringing partially modified control data to a consistent state, and this scheme forces all clients to reconnect when any client fails when inside the server library. This also makes the system go through its recovery process (which is used to guarantee atomicity in managed data, as explained earlier) and reinitialize the control data. This solution, though effective, is not practical. Consider a large SMP machine with 64 processors, and perhaps 50 client connections to the database. Any single unexpected exit will cause all client connections to be severed. This is a heavy hammer, especially in mission critical applications, which require the same stability guarantees that indirect connections provide, but desire the speed advantages of direct connection client-server systems like in-memory DBMSs.

There have been other proposals to address these issues, which have proven to be partial solutions. Molesky and Ramamritham have proposed hardware-based cache coherency models that can ensure control-structure coherency even in the presence of node failures. They define a node as a process/memory pair executing a given transaction. But to implement their scheme, special hardware instructions are required to lock cache lines, and a special cache line structure is needed to tag it with the correct identifier. These hardware properties are then used to implement a recovery scheme that does not involve shutting down all connections to the database. Even with advances in process architecture, the proposed requirements have not been generally met in modem processors. Thus, this scheme is not practical to implement today. Other schemes have been proposed that rely on message passing between different processes. However, they have the same performance shortcomings of indirect connections.

Another scheme that can be modified to handle the issue of invalidation is the checkpoint protocol proposed by Neves et al. The chief shortcoming of this protocol is the assumption of entry consistent shared memory system. In such a model, all accesses of shared memory are assumed to be protected and there are no dependencies between the various accesses. This model is impractical for a complex system such as a DBMS. In a DBMS, multiple segments of the shared memory may be accessed and updated in a dependent fashion as a single unit. Yet another set of schemes have been proposed by Ganesh et al. to reduce the time taken to recover from a failed client. But these schemes fail to achieve consistency in control data.

Thus, there is a need to improve techniques to achieve control data consistency in directly connected client models. An example of such a system is where directly connected client processes execute in the same process as a DBMS and in particular when the DBMS is an in-memory DBMS. These techniques should be widely portable to all hardware platforms—i.e., the techniques should be hardware-neutral—and practical, should achieve control data consistency without sacrificing performance or concurrency, and without large storage requirements.

We have seen earlier that logging techniques are used to track changes to managed data to guarantee the atomicity of client actions. Typically, these techniques are not used to track changes to control data. Control data is mostly transient and exists to assist the server in managing execution of actions performed on behalf of the clients. Additionally, traditional indirect connections insulate the system from having to deal with partially modified control data; and therefore achieving consistency in control data is not an issue for these traditional systems. However, for the directly connected clients, it is paramount to reach a consistent state for the managed data otherwise all execution has to end.

One could propose to log all changes to the control data to persistent storage, similar to the scheme that was described earlier for managed data. This will require considerably more non-volatile storage given the volume of log that would be generated. More importantly, such a system will be much slower because of frequent access to slow non-volatile storage, and the system will be disk-bound. Thus this scheme is not practical.

SUMMARY OF THE INVENTION

We propose a new technique for ensuring consistency in control data for direct connection client server systems. We propose a technique that uses the principles of traditional data logging, but in the context of control data, and define broad principles to be employed in the design of the failure recovery subsystem. The proposed apparatus consists of critical sections, oplogs, an oplog generator, a connection monitor process, and oplog cleaner processes. This apparatus together is known as the Oplogging System.

DETAILED DESCRIPTION

Figure 1:
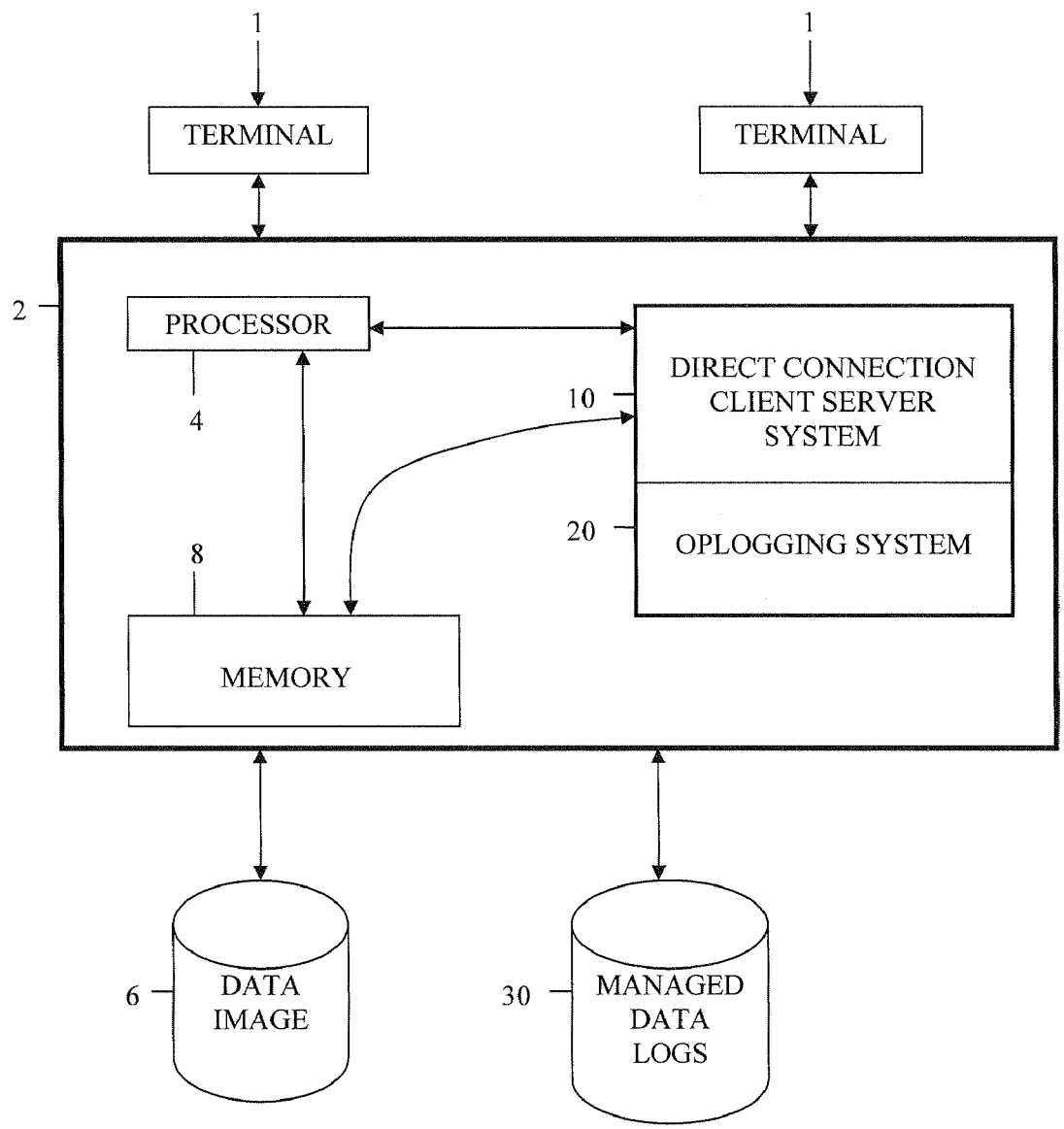
FIG. 1 is a diagram of a direct connection client server system that supports oplogging, according to an embodiment of the invention.

We define these components below and describe each component in detail in rest of this section. The Oplogging System consists of:

Critical Section: A critical section defines where enhanced failure recovery may be required when a direct connection client manipulates control data.

Oplog: To help failure recovery, a log of the control data, known as oplog, is maintained.

Oplog Generator: This is a part of the server library (which is a part of the direct connection client). Executing direct connection client uses the oplog generator to maintain oplogs when executing inside a critical section.

Connection Monitor Process: A process in the server monitors the health of direct connection clients. On failure of a direct connection client, the connection monitor process launches one or more oplog cleaner process (defined below) for undoing the effects of the failed clients.

Oplog Cleaner Process: This process reads the oplogs for the failed client, and restores control data and then calls rollback on the managed data.

The concept of critical section is central to the Oplogging System. A critical section is a part of the server library where the death or unexpected exit of a direct connection client will leave control data in an inconsistent state. We defined earlier a consistent state for control data to be a state from which rollback can be performed on the managed data. Therefore each critical section needs protection to ensure that the server can examine the unfinished action that was being executed by the direct connection client and take corrective action to reach a consistent state for the control data; and thereafter perform a rollback on the managed data so as to ensure atomicity. Note that a critical section typically modifies shared data protected by synchronization primitives. However, synchronization primitives are not always necessary. A critical section may consist of changes to connection-specific information, which may not be exposed to any concurrent access. But for discussion in this document we will assume the general condition that critical sections are protected by synchronization primitives. Note that critical sections in a complex system may be large, as they may access multiple shared data structures that are protected by synchronization primitives. Therefore, sophisticated schemes are required to help the server understand exactly where the application was and what corrective action can then be employed to bring the control data to a consistent state.

For each critical section we define a oplog. The oplog is an adaptation of the well-known logging schemes to control structures in managed data. However, unlike traditional logs for the managed data, the design of the oplogs for the embodiments of the invention is intimately tied to the structure of the critical section that it protects. A simple critical section will have a data field, which we identify as field "A", and might or might not have a synchronization primitive protecting the control data. As mentioned earlier, we will assume for the purpose of this discussion that a critical section will always have a synchronization primitive protecting the control data. A oplog for use with a critical section has at least the two structures—a CriticalSectionID field that is set to either inactive or identifies the critical section that the oplog is associated with, and a StepNumber field which identifies where execution is in the critical section. There may be more fields specific to the critical section. For example, the simple oplog under consideration can have another field that stores the old value of field A. In this simple case, the critical section starts when we acquire the synchronization primitive and ends when the synchronization primitive is released. In this critical section a synchronization primitive is acquired on field A, then the value in field A is incremented, and lastly the synchronization primitive on field A is released.

Figure 7:
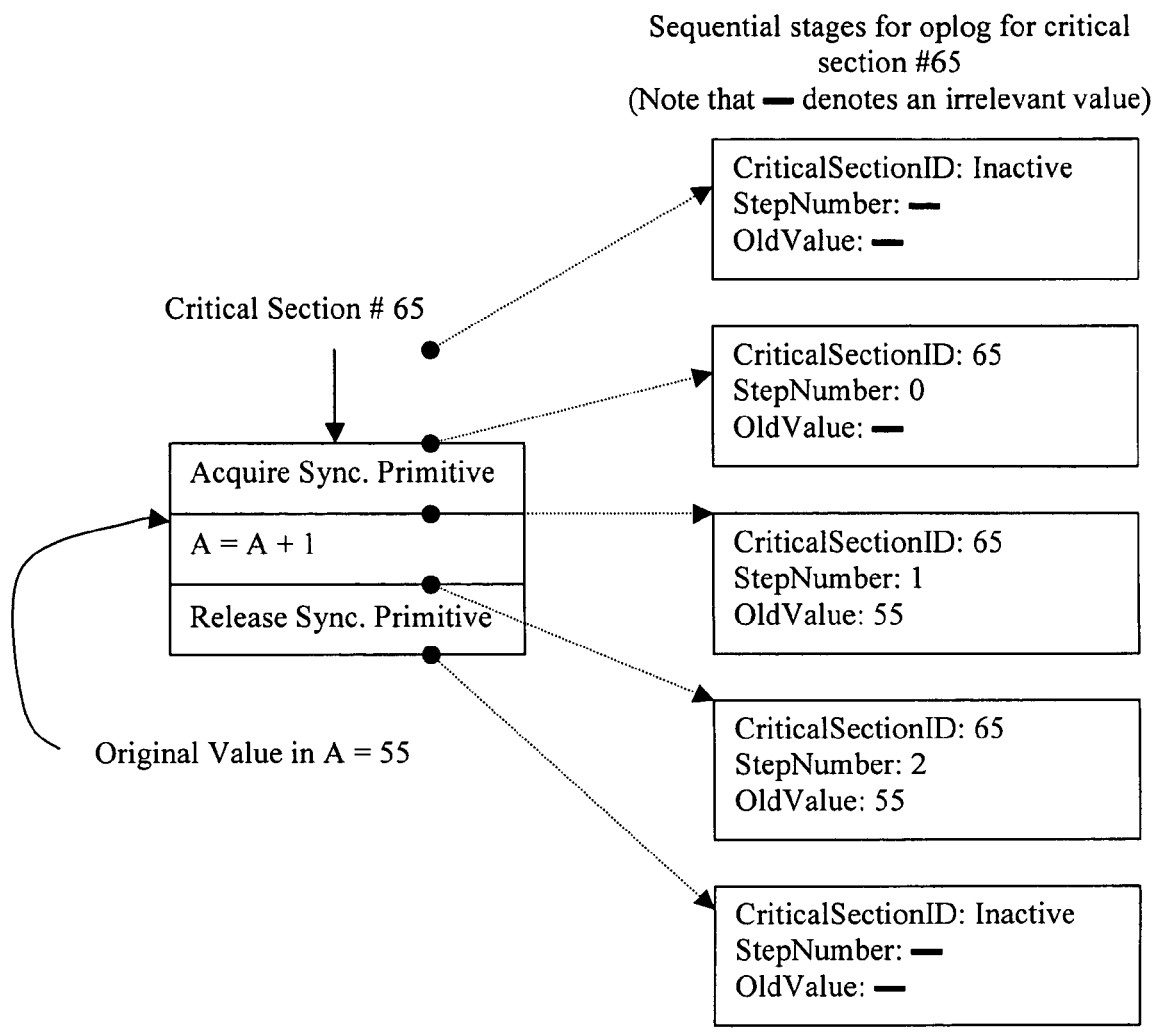
FIGS. 7-9 show example critical sections and associated oplogs, according to an embodiment of the invention.

FIG. 7 shows an example of this control structure and associated oplog. The oplog needs to reflect the control data state whenever the client connection is in a critical section. Here we detail the states that the oplog goes through for a simple critical section. In the initial state the oplog will be inactive with CriticalSectionID set to Inactive. At this time there is no information in the oplog, and such a oplog will not be processed by a oplog cleaner process. Before the synchronization primitive is acquired the oplog StepNumber will be set 0, and then the CriticalSectionID will be set to the current critical section identifier, which in the example is 65. After acquiring the control primitive, but before the value in field A is changed (incremented in the example), the oplog will first store the current value of A in OldValue which is 55 in the example; and then set the StepNumber to 1. After field A's value is incremented, that event is indicated in the oplog by changing StepNumber to 2. Thereafter the critical section releases the synchronization primitive and ends. The oplog is cleaned by setting its CriticalSectionID to Inactive.

For a more complex critical section, the oplog can be correspondingly more complex. Distinct steps for oplogging are after acquisition of synchronization primitives and before release of the synchronization primitives. Values are recorded before the change to the fields, but after the synchronization primitives have been acquired. An example of such a critical section is when two values are changed which are under different synchronization primitives, but are part of the same critical section and form one logical operation. Consider a critical section that covers two control data fields A and B. Field A is changed first and then field B, each under a different synchronization primitive. In this example the critical section will acquire synchronization primitive on field A, increment the value in field A, and then release the synchronization primitive on field A. The critical section will then acquire a synchronization primitive on field B, and increment the value in field B by the value it found in A.

Figure 8:
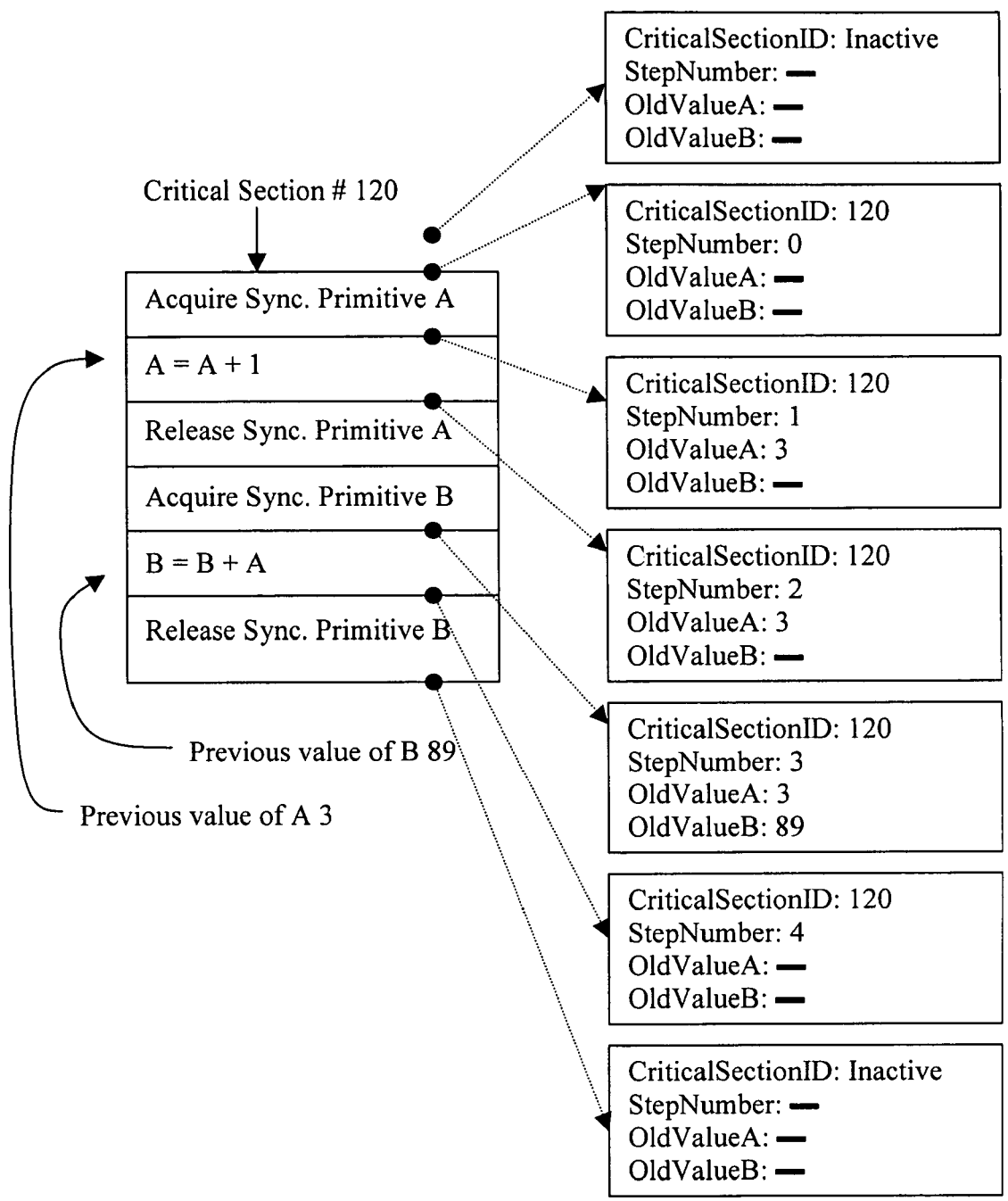

FIG. 8 shows an example of this more complex critical section. The associated oplog for this operation consists of the required fields StepNumber and CriticalSectionID. Two more fields are used to store the values of the fields A and B: OldValueA and OldValueB. Note that if fields A and fields B are not at well known locations then two more fields can be used to store the locations of the fields A and B. Additionally, if the synchronization primitives for fields A and B are not at well known locations then two more fields can be used to store the location of those synchronization primitives. In this example we assume that the fields A and B as well as their synchronization primitives are at well-known locations.

Since the corresponding oplog reflects all transitions that the control data goes through, the oplog will go through 7 states. Before the start of the critical section, the oplog will be in an Inactive state i.e. its CriticalSectionID field will be set to Inactive. However, before the acquisition of the synchronization primitive for A, the StepNumber is set to 0 and the oplog's CriticalSectionID is set to 120, which uniquely identifies the critical section. After the synchronization primitive for field A has been acquired, but before the value in field A is changed, the oplog stores the current value of field A in OldValueA: in this case, 3; then the StepNumber is set to 1. Once the value in field A is changed (incremented in this case from 3 to 4), the oplog's StepNumber changes to 2. After that the synchronization primitive for field A is released and the synchronization primitive for field B is acquired. The oplog reflects this change in synchronization primitive by storing the previous value of field B, 89 in this example, and changes its StepNumber to 3. After the value in field B is changed, the StepNumber is changed to 4. Thereafter the synchronization primitive for field B is released. Since the critical section ends after that, the CriticalSectionID field of the oplog is cleared (i.e. set it to Inactive).

An important consideration for the oplogs is whether client actions can leave the oplogs in an inconsistent state. If the oplogs are left in an inconsistent state, then the oplog cleaner process, mentioned earlier in this section and discussed in greater detail later, can run into the same problems that were described earlier about inconsistent control data. To avoid this, an oplog has one or more enabler flags. For the oplog examples that were detailed above the StepNumber and CriticalSectionID fields serve as the flags. These two fields are used to ensure that the oplog cleaner process will find the oplogs in a consistent state. At the start, the CriticalSectionID is Inactive indicating that the control data has not been modified. Then the StepNumber field is set to 0 and only then is the CriticalSectionID set to the corresponding identifier for the critical section. Note that such a oplog is consistent since by the time CriticalSectionID is set, the StepNumber is already set to 0. Should the oplog cleaner process have to act on this oplog at this stage, it will only try to ensure that the corresponding synchronization primitive is released if held. The oplog cleaner process will not change any values in the control data. Thereafter, the oplog stores all needed values before it advances StepNumber. The oplog always has the needed data for a given StepNumber. This ensures that the oplog cleaner process examines the oplogs in a consistent state and is consequently able to bring forward the control data to a consistent state. Note that for a given client request there are no overlapping critical sections. By definition, multiple "critical sections" that overlap must all be executed for a given client request, and are one critical section. However, we allow for nested critical sections.

Figure 9:
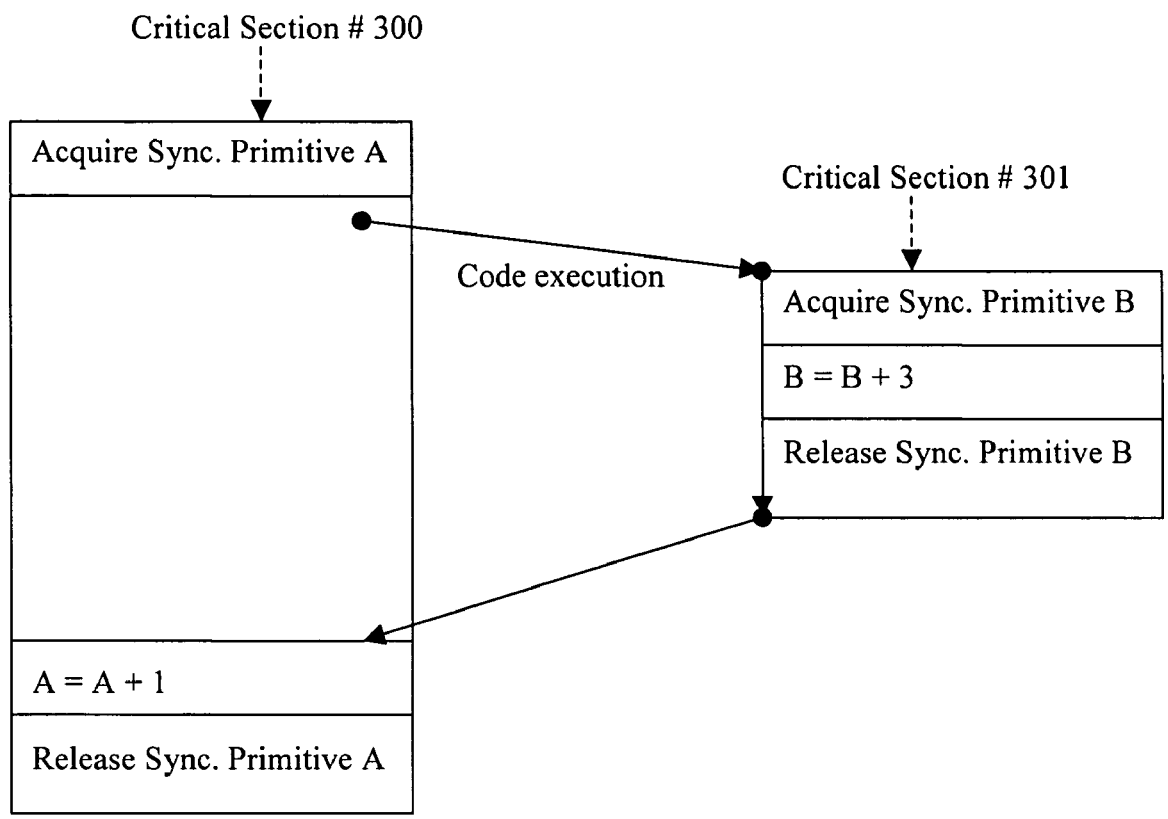

An example of nested critical sections is shown in FIG. 9. Let there be critical sections 1 and 2. In critical section 1, the first synchronization primitive for field A is acquired. But before changing the value in field A, a function call is made. In the function call, another critical section 2 exists which acquires a synchronization primitive on field B, changes the value in field B, releases the synchronization primitive and then returns. After returning, in critical section 1, a change is made to the value in field A, and then the synchronization primitive on A is released. Theoretically, all nested critical sections are one critical section. However, a combination of different function calls may give rise to many different critical sections that are combinations of constituent critical sections. Our scheme allows for nested critical sections since that is more pragmatic for good software system design.

One implication of this approach is that there may be more than one oplog (corresponding to each instance of a critical section) open at the same time. The semantics of this system are that the oplog that is the newest one (deepest in the nesting level) will have to be cleaned up by the oplog cleaner process first before going up one level. Note that the nesting depth of oplogs is dependent on the specific application, and there is no theoretical limit on what it should be. However, there are simple heuristics to minimize the nesting depth of oplogs. Long and complex client actions should be broken down into smaller actions and their associated oplogs stored in a well known location, which the rollback process can use to clean control data before rolling back any effects on managed data. If the client action is smaller, the corresponding critical section will tend to be less complex and smaller, and the overall nesting depth is likely to be smaller. Another heuristic is to break a long client-action into a series of smaller client actions; then the critical sections will also be smaller.

We stated that one of the objectives in the design of the Oplogging System is that memory requirements should be low. Note that the oplogs store the state of the control data and the step in which a particular execution is. On process exit, this information needs to be available to some clean up process (as mentioned earlier, with reference to the oplog cleaner process). The oplogs can be logged to a persistent storage, where they can be picked up by the oplog cleaner process to achieve control data consistency. However, excessive disk writes and reads can have an unacceptable performance penalty. An alternative would be to store all oplogs in main memory instead of the disk. This design avoids performance problems. However, if the oplogs are stored sequentially like the traditional logs under WAL scheme are stored and purged only on a checkpoint, it will lead to excessive space requirements, and is therefore impractical.

To avoid performance penalties and excessive space requirements, in one embodiment of the invention, the oplogs are stored in a stack in the main memory. A stack is a well-known storage structure in the art, where the newest entity is on top and oldest one is at the bottom. In this design the space requirements is equal to the level of nesting of the oplogs. Also, in this design we assume that an inactive log is equivalent to a non-existent oplog. This assumption does not lead to any new requirements, in fact, it follows from the design of oplogs, that no action is taken on an inactive oplog and therefore it might as well not exist. Thus, for each connection enough space is allocated to hold the deepest oplog stack that the system can possibly generate. At the start, the stack has no data. Each time a oplog is needed it is allocated from the stack. At allocation the oplog is inactive. Once a critical section ends and a oplog is no longer needed, it is marked inactive and is returned to the space reserved for the oplog stack.

Another important piece—is the oplog cleaning apparatus. Even in the given environment of directly connected clients, some processes run separately from any client to perform maintenance tasks. One such separate process, which monitors client connections, is the connection monitor daemon. On unexpected client death or exit of the direct connection client process, the connection monitor daemon detects the exit of the client process and initiates recovery. Recovery for a directly connected client exit consists of two parts: bringing the control data to a consistent state, and rollback of the managed data to achieve atomicity. First we detail the method by which the connection monitor daemon recovers the unexpected failure of a single client with one connection to the server. Then we will explain the design needs to handle the issue of multiple clients with multiple connections to the server.

In one embodiment, before operating on the managed data, a directly connected client (in a direct connection client server system) requests the connection monitor daemon to grant a connection. The connection monitor daemon can then store information about this directly connected client. In one embodiment, a socket, a well-known operating system construct, is used to ensure that the connection monitor daemon can monitor the health of the directly connected clients. Upon successfully establishing a connection, a socket is opened between the client and the connection monitor daemon. Then unexpected exit of the client process is detected by the connection process daemon when it finds that the socket has been closed unexpectedly. When the connection monitor daemon determines that a client has exited unexpectedly, it invokes the oplog cleaner process. On invocation the oplog cleaner process examines all the oplogs that are active for the given connection (the oplogs themselves are stored in the shared memory and are in a consistent state, as explained earlier).

We now detail the actions the oplog cleaner takes, using the examples for the oplogs described above in FIGS. 7-8. For the oplog of FIG. 7, the oplog cleaner determines if the oplog is still active. As noted earlier, the oplog is inactive both before and after the critical section. However, there are three states for the oplog corresponding to StepNumber 0, 1 and 2. In StepNumber 0, no change has been performed on the control data. Therefore the oplog cleaner only attempts to release the synchronization primitive if it is held. If the StepNumber is 1, the oplog cleaner reinstalls the previous value recorded in the oplog (OldValue) into the field A. If the StepNumber is 2, the oplog cleaner does no cleanup, since the control data will be considered consistent. However, the client-action may not have released the synchronization primitive. The cleaner will release the related synchronization primitive if it has not been released. Thereafter a rollback will be called on this connection to ensure the atomicity of managed data. Before rollback, the oplog cleaner process ensures that all synchronization primitives that are related to the oplogs that were found to be active are released. Also, any synchronization primitives held by the given connection are released at the end of rollback.

The complex oplog of FIG. 8 has a correspondingly complex oplog cleaner. Note that there are 7 states and 2 synchronization primitives in the example. First, the oplog cleaner process notes the StepNumber in which the client-action exited. If the oplog is in StepNumber 0 or 4, no action is required on the control data. In the StepNumber 1, the oplog cleaner process reinstalls the old value for field A from OldValueA. For the StepNumber 2, the oplog cleaner process releases the synchronization primitive for field A if held, and then executes the rest of the action: i.e. change the value in field B. For StepNumber 3, the oplog cleaner process reinstalls the old value in field B from OldValueB, and executes the rest of the action of changing the value in field B. At the end of each step, the oplog cleaner process releases the synchronization primitives for both field A and field B, if either of them is still held. Note that the corrective action for the second and third steps may be even more complex than mentioned above. The corrective action will depend on the structure of the rollback for the managed data that will be initiated at the end of oplog cleaning. If the rollback needs the critical section for client-action to be completed then the oplog cleaner process performs the steps described above. Otherwise, the oplog cleaner process can choose to simply rollback the change to values for field A and field B. For example if the change in field A were an increment, the oplog cleaner process can a decrement after value in StepNumber field is 2 to restore A. Finally a rollback will be called on this connection to ensure atomicity of managed data.

In a multi-client system, many clients with several connections to the server might fail unexpectedly at the same time. Since a given client executes concurrently with other connected clients, any given client might die holding synchronization primitives, which can either block the execution of new or currently connected clients or block the recovery of other clients that have failed unexpectedly. Therefore special handling is required to ensure that all control data can be brought to a consistent state and that rollback on managed data will finish successfully for all clients that failed unexpectedly, and at the same time to ensure that all already connected as well as new clients can make progress.

At this point a comment is required on common types of synchronization primitives. There are two common kinds of synchronization primitives—application locks (usually application implemented complex synchronization primitives that provide ordering, waiting and other services and guarantees) and systems latches (basic system locks like semaphores etc.). A problem common to all synchronization primitives is deadlock. A deadlock is a situation where two or more processes wait for synchronization primitives acquired by each other. This prevents progress by any participant in the deadlock cycle. Deadlocks in application locks are relatively easy to find; i.e. the application can take some corrective action if it finds any such deadlocks since the application has access to all information about these deadlocks. But system latch deadlocks are hard to act upon. In such a situation, the processes participating in the deadlock cycle make no progress; the application does not have any information on the deadlock and no corrective action is possible. The situation gets more complicated with unexpected client deaths—both application locks and system latches need to be released by the connection monitor daemon at the appropriate times to ensure correct execution of the concurrently connected clients.

If the connection monitor daemon launches the oplog cleaner process sequentially for each failed client, then it will run into deadlocks. Instead, embodiments of the invention use a highly concurrent design for launching oplog cleaner processes. This solution guarantees that there will be no deadlocks. The connection monitor daemon launches a new oplog cleaner process for each connection of each failed client concurrently. Those skilled in the art will recognize that the oplog cleaner processes might as well be threads of the same process, i.e. the connection monitor daemon has the choice of spawning oplog cleaners as new threads or processes. For example, if 3 clients die each with 2 connections to the server, then 6 oplog cleaner processes can be launched at the same time, each cleaning one specific connection. The order in which the processes are launched does not matter as long as they are all launched. This design guarantees that oplog cleaning processes do not deadlock because all synchronization primitives acquired by the failed processes will be eventually released, preventing infinite waits on any such synchronization primitives.

The apparatus of Oplogging System described above has wide applicability. For example, it may be applied to well-known critical sections in the field of databases, such as portion of table creation, index creation, etc. Other critical sections include cursor open, next and close operations on various kinds of cursors, such as table cursor, index cursor, hash cursor, etc. Yet other examples of critical sections are the creation of temporary indexes like tree indexes, hash indexes, etc. Furthermore, then Oplogging System can be used in insert, delete, and update operations of underlying tables and various indexes. These critical sections may entail the creation or deletion of a slot in a table page, changing counts and directories, etc. The Oplogging System can also be used to protect actions like creating a new log file, opening a log file, and closing a log file. Yet another set of operations where the Oplogging System can be used is in the lock manager, for operations such as getting a lock, releasing a lock, etc. Embodiments of the invention can also use these techniques in compilation of SQL commands in DBMSs. The above examples from the field of databases are not meant to be an exhaustive list of critical sections that may employ the Oplogging System. Instead, these are intended to give a flavor of critical sections that can benefit from Oplogging; the potential usage is much wider.

The Oplogging System may seem complex and unwieldy. However, results from a practical implementation of the Oplogging System are very encouraging. In one test, only 125 critical sections and corresponding oplogs were needed. The oplogs were stored in a stack of depth 11, since the maximum nesting depth for the oplogs is 11. Thus there is minimal memory overhead for oplogging all changes in control data. Additionally, performance results are good. The addition of the Oplogging System has reduced throughput by less than 10% when 1 client is directly connected to the server; there is no discernable slowdown when more than 1 client are connected to the server. Test show that the Oplogging System is an effective technique for ensuring continued availability of server component in presence of failure in directly connected clients.

FIG. 1 shows a direct connection client server system that includes data (both managed and some persistent control data) 6 and a processor 4 (Central Processing Unit CPU)), a main memory module 8 that processor 4 communicates with. A computing device 2 containing processor 4 and memory 8 in one example is a server. The computing device 2 stores and executes software for the direct connection client server system 10. The direction connection client server 10 contains a module called the Oplogging System 20. The processor 4 may be a single CPU or multiple CPUs that operate in the server 2, with a shared addressable memory 8. The data 6 is typically stored on a plurality of direct access storage devices (DASDs) although only one such device is illustrated in FIG. 1. A person skilled in the art will recognize that the data 6 can be stored on only one DASD, if desired. In addition, a person skilled in the art will recognize that any other machine-readable medium can be used to store the data 6. The DASDs may be, for example, disk packs, and it will be understood by those skilled in the art that the database system includes the required DASD controllers and channels that establish the communication between the data 6 and the processor 4. In another example, the data 8 may be stored inside the main memory 8 itself. Not shown in FIG. 1 are other components of server 2: for example, a keyboard, mouse, or monitor. In addition, although server 2 is termed a "server", a person skilled in the art will recognize that any machine can server without specifically being termed a "server". For example, a desktop computer, a notebook computer, or any other computing device, properly equipped, can serve as "server" 2.

Terminals 1 are any input/output (I/O) device that accept requests from and return results to users. For example, the terminals may be personal computers (PCs) or applications that use the advertised application programmer interface (API). Requests are submitted by the client from the terminals 1 and are processed concurrently by the direct connection client server system 10 in conjunction with its Oplogging System 20.

Terminals 1 can be either directly connected to server 2, or can be connected to server 2 via a network (not shown in FIG. 1). If terminals 1 are connected to server 2 via a network, the network can be of any form. For example, the network can be a direct cable connection (where there are no intermediary links between terminals 1 and server 2), connected via a local area network (LAN), a wide area network (WAN), or a global network such as the Internet. In addition, the connections between terminals 1 and server 2 can be either wireline connections or wireless connections. If the connections are wireless, then any wireless type of connection can be used. For example, any connection complying with the IEEE 802.11 a/b/g standards, or with the Bluetooth standard, can be used.

Figure 2:
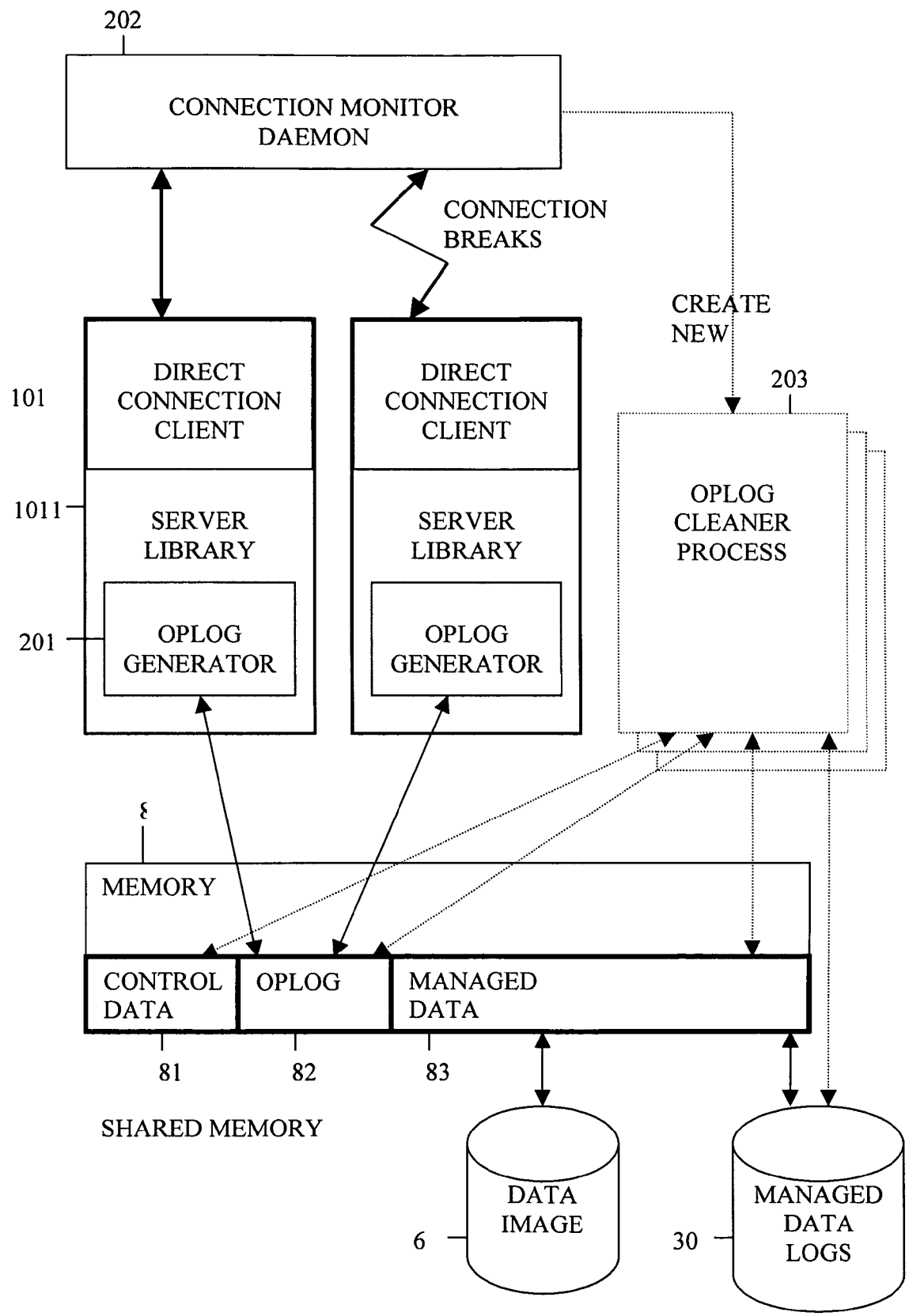
FIG. 2 is a schematic diagram showing details of oplogging in the direct connection client server system of FIG. 1, according to an embodiment of the invention.

FIG. 2 shows more details of a Oplogging System 20. The Oplogging System helps maintain consistency of the control data. We first explain how the Oplogging System provides the ability to execute new client actions and execute uninterrupted client actions for those clients that have not failed, and then explain in detail the schematics presented in FIG. 2. Traditional logs 30 are maintained on a storage device like the one data 6 is stored on. These logs are used to recover the system in case of failure and help maintain atomicity of managed data. These logs are written for managed data changes only and not for changes in control data in the direct connection client server system 10. In one embodiment, the image of the data 8 in the memory is divided into 3 segments. The first segment 81 is the control data. This data defines meta-data about the structure of the database and information about currently open client actions and their states, in essence, this is the control data. Oplogs 82 is the area reserved for storing information about the control data on behalf of executing client processes. Data 83 is the segment that stores the managed data in the direct connection client server system. A prior image of the data 8 is stored as data image 6 on any DASD. For any change to the data, managed data logs 30 are generated and sent to DASD. This ensures that in the event of unexpected failure of client, like that of the failed client 101, which may have died in the middle of a critical section, the Oplogging System 20 can take over and find any oplogs 82 that correspond to the failed client process, undo any effects to the control data and bring it to a consistent state, and then call Rollback on the actions executing on behalf of the client. This will accomplish the traditional rollback on the managed data using the managed data logs 30 and data image 6. Thus, the Oplogging System 20 ensures continuous availability of the direct connection client server system to other clients even in presence of unexpected failures of client processes 101.

Now we define in detail the schematics presented in FIG. 2. Note that we focus on the interaction of the direct connection client 101, the client part of the direct connection client server system 10, and the constituents of the Oplogging System 20, the oplog generator 201, oplogs 82, connection monitor daemon 202, and the oplog cleaner process 203. The direct connection client 101 consists of an application that uses vendor supplied server library 1011. The oplog generator 201 is a part of the server library 1011. The oplog generator 201 generates oplogs when the direction connection client 101 is in a critical section. When the client connection 101 enters a critical section, oplog generator 201 creates a oplog in the oplog area 82 of the shared memory 8. A connection monitor daemon 202 has a socket opened with each direct connection client 101. When a particular client exists unexpectedly, the socket connection with the connection monitor daemon breaks. This is shown in the second direct connection client in FIG. 2. The connection monitor daemon 202 uses this unexpected severing of the socket connection as an indication of unexpected exit of a direct connection client. In the event of unexpected failure of any direct connection client server 101, the connection monitor daemon 202 launches a oplog cleaner process 203 for each connection that had been active in the failed process. Note that multiple oplog cleaner process 203 may be launched, as indicated in FIG. 2. The oplog cleaner process 203 takes over the connection, looks for any active oplog that exists in oplog area 82 for the failed client, and undoes any changes that were made to control data made due to the failed client. This returns the control data to a consistent state from which all active actions of the failed client on the managed data can undergo Rollback using the managed data logs 30. The process of returning the database to a consistent state both for the shared and the control data and of rolling back the active actions of a failed client are conducted while the server system remains continuously available to the other active clients that have not failed.

There are many examples of how oplogs can be used to provide continuous availability of direct connection client server systems even in presence of process failure in the middle of a critical section that changes control data. As mentioned earlier, it is not be possible to enumerate all possibilities in this document; however, we aim to provide a flavor of the possibilities by visiting three different applications of apparatus outlined in this document. First, we will describe a relatively simple application of the oplogging technique in a simple critical section operation "open a cursor on a given table". Such operations are frequently used to get access to data by client connections. Other operations that form an integral part of data access are "get next value given the cursor" and "close the cursor". We describe the first one to illustrate how continuous availability is achieved. Next, we describe an application of oplogs in modifying a doubly linked list where it is necessary to maintain the integrity of the linked list in presence of client process failures, otherwise subsequent client connections may loop indefinitely or may access unallocated memory and then themselves fail. Third, we describe the application of the oplogging techniques in loop situations. Here an operation consists of repeatedly doing similar actions and the loop execution has to either complete or roll back to ensure consistency. These examples will provide a flavor of the wide applicability of oplogging technique.

Figure 3:
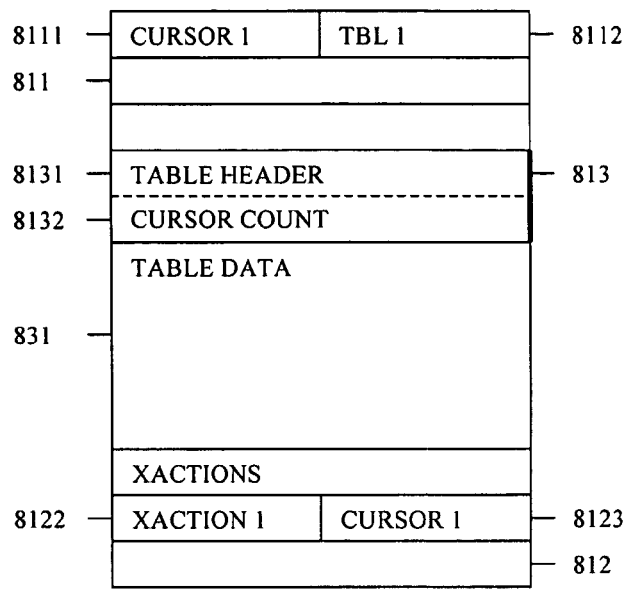
FIG. 3 is a schematic diagram showing an instance of an oplog of FIG. 1 for a representative critical section "open a cursor on the table", according to an embodiment of the invention.
Figure 3:
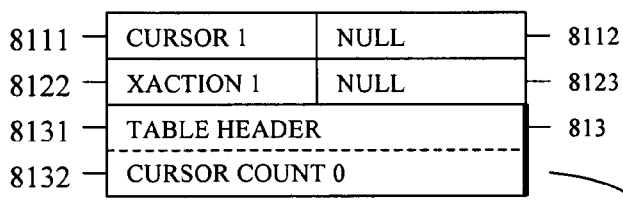
Figure 3:
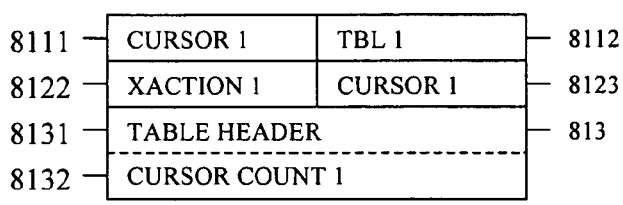

FIG. 3 shows details of a simple critical section operation and the design of the oplog that ensure availability of the direct connection client server system 8 in presence of client exits. We take a DBMS example. Assume that control data 81 consists of three parts. Cursor structure 811 stores information about cursors in the data 8. Transaction structure 812 stores information about transactions in the system. Table structure 813 stores information about the given table. When a client process uses a vendor-supplied library to access data in data 8, an "open cursor on given table" operation may be performed.

We show the initial and final state of the control structures 811, 812 and 813 to illustrate how an "open cursor on given table" operation affects the control structures. In the initial state, the transaction 8122 had not opened a cursor. Therefore, its cursor field 8123 is NULL. Similarly the cursor 8111 is not being used and therefore it table field 8112 is NULL. In turn, the table header 8131 notes that no cursor is open on the table and therefore the cursor count 8132 has a value of 0. When operation "open cursor on given table" for transaction 8122 successfully finishes for table 8131 we reach the final stage. In the final stage, transaction 8122 has a cursor pointer stored in its field 8123, which points to cursor 8111. Cursor 8111 in turn has table pointer 8112 initialized so that it points to table 8131. Table header 8131 had a cursor open on it and therefore its cursor count field 8132 is now 1.

If there were any failure in the client process at any time during the execution of this critical section operation, control data 81 may be left in an inconsistent state where the table header's (8131) cursor count field 8132 is not zero when no cursor points to it. Or, it may be zero when the cursor 8111 has its table pointer field 8112 pointing to it. We need to make sure that independent of when the failure occurs, we are, in fact, able to proceed to an initial or final state that is consistent.

Oplog structure 821 provides the details of one state of a oplog used to track changes being done on control structures. Other than CriticalSectionID and StepNumber, it stores the transaction number (XACT), cursor identifier (CURSOR), table identifier (TABLE), and previous cursor count of the table (COUNT). Thus, if there is any failure in the client process before the operation "open cursor on given table" successfully finishes, i.e. before the system reaches final state and the oplog's CriticalSectionID is set to Inactive, the oplogging System can use oplog 821 to undo any effects of the execution of the critical section operation "open cursor on given table". In particular, if the oplog cleaner process picks up the oplog 821 in the state mentioned in the example, it may simply reinstall NULL in the cursor pointer field 8123 of transaction 8122. It installs NULL in the table pointer field 8112 of cursor 8111, and resets the cursor count field 8132 of the table header 8131 to the count stored in the operation oplog 821, which is 0 in the given case. Thus, the oplogging System undoes the effects of any active oplog 821 it finds for the client process. At this point, the oplogging System calls Rollback for the client process, which undoes any managed data effects that the client process may have had. Thus, the oplogging System ensures that both control data and managed data in the client-server system are consistent and continuously available.

Figure 4:
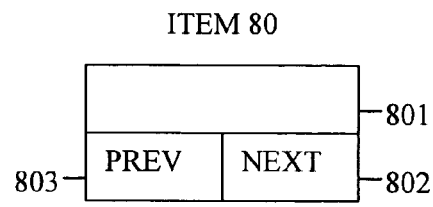
FIG. 4 is a schematic diagram showing an instance of an oplog of FIG. 1 for a representative critical section "transfer element between linked lists", according to an embodiment of the invention.
Figure 4:
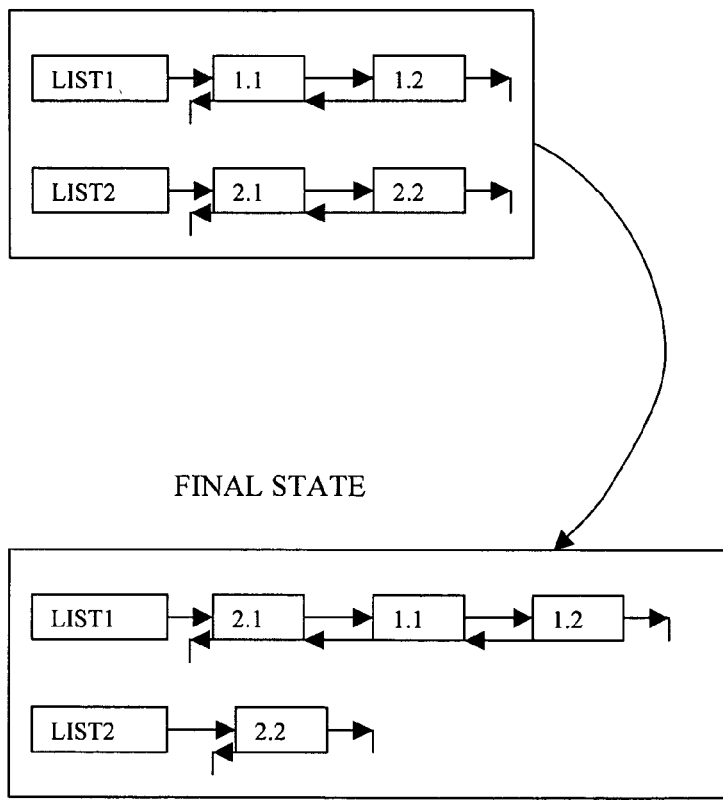

FIG. 4 provides yet another example of application of the oplogging principles that we have detailed above. A well-known and common operation in databases is linked list maintenance. FIG. 4 shows such an example. The control data segment of the data 8 consists of two linked lists LIST 1 and LIST 2. Each list is made up of items 80. Item 80 consists of three fields, data 801, next 802, and previous 803. The operation transfers an element from the head of LIST 2 to the head of LIST 1.

In the initial state of 814, LIST 1 has two members ITEM 1.1 and ITEM 1.2. These are linked in a technique known as doubly linked list. Under this scheme, the list points to the ITEM 80. The next field 802 of ITEM 80 points to the next ITEM 80 and previous field 803 points to the previous ITEM 80 in the list. Similarly, LIST 2 consists of two members ITEM 2.1 and ITEM 2.2. The operation identifies ITEM 2.1 to be transferred from LIST 2 to the head of LIST 1. In the final state of the control structure segment 814, we find that ITEM 2.1 has been transferred to the head of LIST 1. Note that this requires changes in LIST 1, LIST 2, the next field 802 of ITEM 2.1, the previous field 803 of ITEM 2.2, and the previous field of ITEM 2.1. To ensure atomicity and consistency via the oplogging™ System 20 we create a new oplog 822. Other than the usual fields, this oplog consists of fields LISTA that points to the first list, LISTANEXT the next on the first list, LISTB the second list, LISTBCUR the ITEM that we need to move from LISTB to LISTA, LISTBNEXT the next ITEM on LISTB from the LISTBCUR, and LISTBPREV the previous ITEM on LISTB from the item LISTBCUR. If the client process executes the critical section operation "transfer element between lists", we first create a oplog 822 that stores the details for each of the listed fields in 822.

If there is any failure in the middle of the execution of the operation "transfer element between lists", the oplogging System 20 will take over and clean the transactions that were executing on behalf of the client process. Note that to achieve a consistent state we can either complete the operation, i.e. reach the final state, or end it in the initial state. Let us assume that given the semantics of this operation we need to end in the initial state. Also note that the oplog is in a given state where the StepNumber is 3. The oplogging System 20 will first search the oplogs 82 and find the oplog 822 that corresponds to the dead client process. Given the state 3, the oplogging System will take the following steps to restore the LIST 1 and LIST 2 to the initial state:

Go to LISTA, which is LIST 1 in this case.
Make LIST 1 point to LISTANEXT, which is ITEM 1.1 in this case.
Go to ITEM 1.1 and set the previous pointer 803 to NULL. Thus, LIST 1 now looks like it was originally.
Next, LISTB, which is LIST 2 in this case, is examined. LIST 2 is set to point to LISTBCUR, which is ITEM 2.1 in this case.
The next field 802 of ITEM 2.1 is set to point to LISTBNEXT, which is ITEM 2.2 in this case.
Finally, the previous field 803 of ITEM 2.1 is set to point to LISTBPREV, which is NULL in this case.

Thus, the Oplogging System ensures that control data segment 814 is now in the initial state. It will then release any synchronization primitives still held. Thereafter Rollback is called on client connection.

Figure 5:
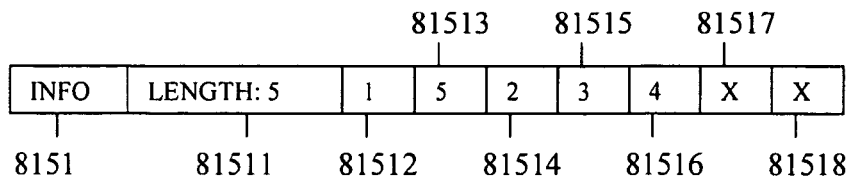
FIG. 5 is a schematic diagram showing an instance of an oplog of FIG. 1 for a representative critical section "move a hole from a list", according to an embodiment of the invention.
Figure 5:
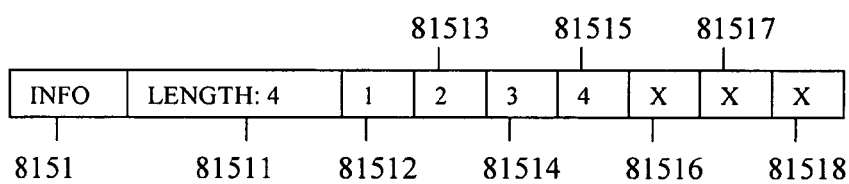

FIG. 5 provides details of a critical section operation that iterates. This operation cannot be considered complete until it finishes the loop. Thus, the only consistent state for the database system 10 is when the control data segment is in the final state. This is the only acceptable final state once the critical section operation "do the loop" starts. Consider an index node 8151. It has the following sub-components other than the header information; a field LENGTH 81511, which stores the number of entries in the node and space for 7 entries, ENTRY 81512 through 81518. Note that for this node, values are stored in a compact manner, i.e. the values are always together and the values in the ENTRY fields start from ENTRY 81512. Let us assume we just deleted the value in ENTRY 81513. After we do that, the only consistent state for the index node is to be in the final state. To ensure that the values are stored compactly when we delete the value in ENTRY 81513, we call the MOVE HOLE program. Note that once the value in ENTRY 81513 is deleted we consider that the value no longer exists and call that entry a HOLE. To maintain consistency, all HOLES should be at the end of the list. We set LENGTH 81511 to 4. MOVE HOLE will ensure that the hole moves to the end of the list. The iteration is at line MH.2 to MH.7. The iteration lasts until the HOLE variable is larger than 81511+ LENGTH (in 81511). Also, note that we are also doing oplogging using the oplog 823. In the oplog we store the node identifier, the length of the node, and position of the HOLE. Once MOVE HOLE is complete, the index node 8151 is in the final state and the oplog 823 is deactivated.

To ensure consistency of the control data and atomicity of transactions on the managed data in the direct connection client server system 10, Oplogging System 20 will take over whenever the client fails in the middle of execution of the MOVE HOLE program. At that time, the Oplogging System will execute the MOVE HOLE program again, however, it will set HOLE at the state of the loop in line MH.1 to oplog 823.HOLE. For example, if the client process died when the code execution in MOVE HOLE was when HOLE was 81515, the Oplogging System 20 will iterate once in MOVE HOLE loop, resulting in the final state for the index node 8151. At that time, the Oplogging System can call Rollback on the transaction that was executing for the client process to ensure data consistency and atomicity.

Figure 6A:
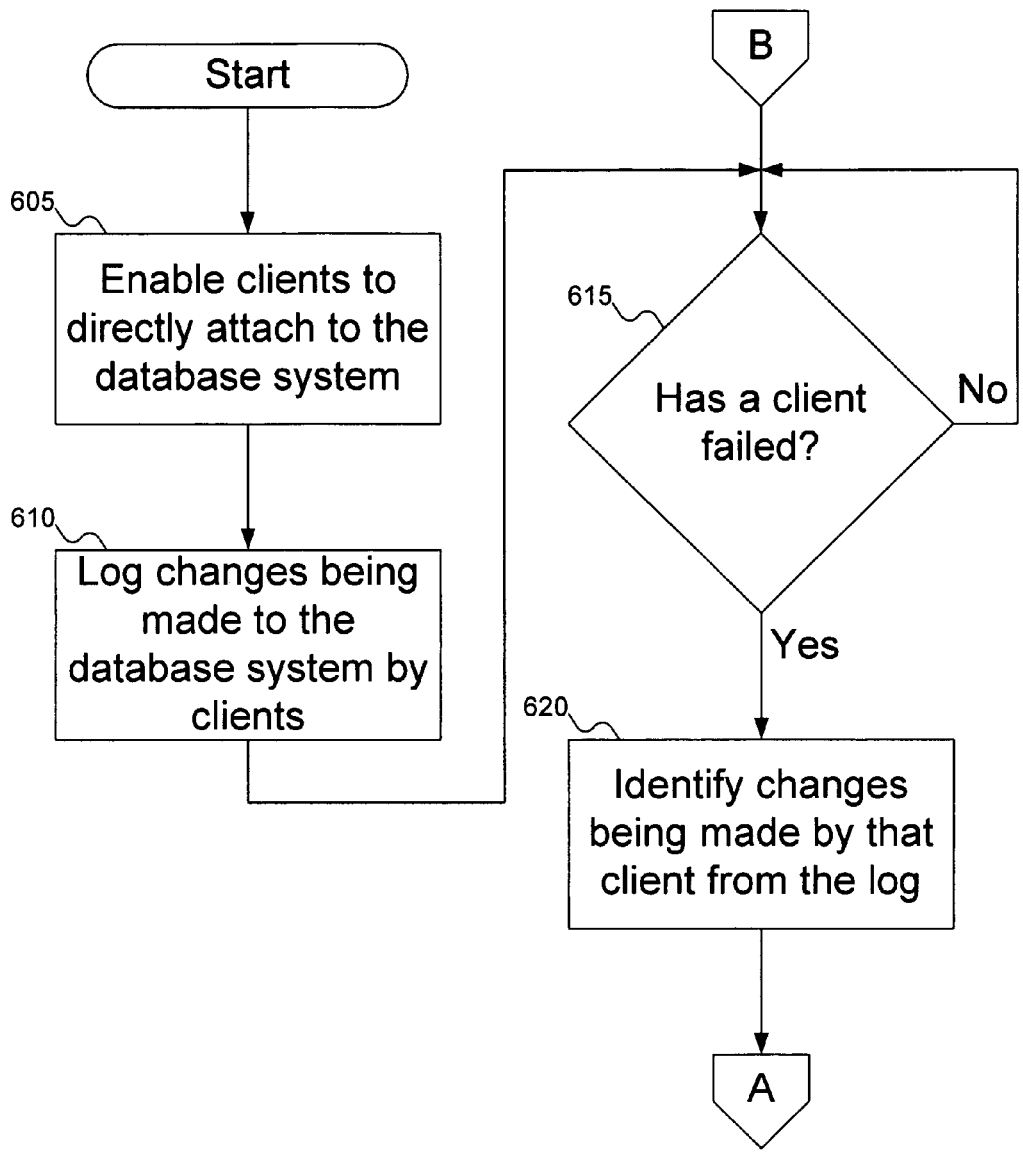
FIGS. 6A-6B show a procedure for using an oplog of FIG. 1 to bring the control data to a consistent state and to rollback any changes done to managed data in the client-server of FIG. 1, according to an embodiment of the invention.
Figure 6B:
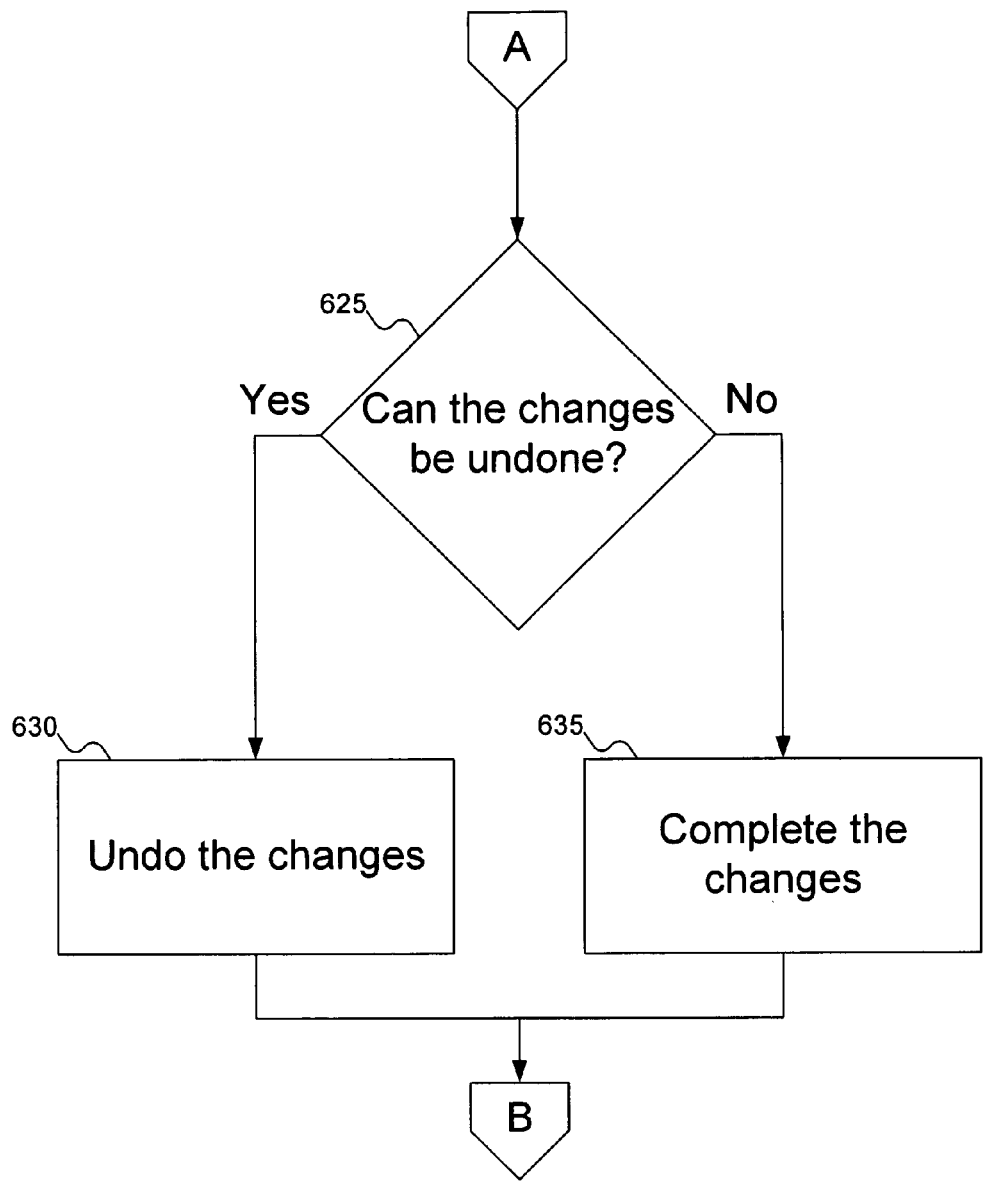

FIGS. 6A-6B summarize a procedure for using a oplog of FIG. 1 to repair the direct connection client server system of FIG. 1, according to an embodiment of the invention. In FIG. 6A, at step 605, the direct connection client server system permits clients to directly attach to the database. At step 610, the Oplogging System logs changes that are to be made to the data by clients. At step 615, the system checks to see if a client has failed. If so, then at step 620, the system identifies the changes that were being made by the client.

At step 625 (FIG. 6B), the system determines if the changes can be undone (assuming they were not completed). If so, then at step 630, the system undoes the changes that were being made by the client. Examples of such changes include leaving tables in an open state, or moving elements between lists, as discussed above with reference to FIGS. 3 and 4. Otherwise, at step 635, the system completes the changes. An example of such a change is moving a hole to the end of a list, as discussed above with reference to FIG. 5. Note that under all cases enough information needs to be available to ensure that changes being made by the client are undone or completed and the control data is brought to a consistent state. It is worth noting that one of steps 630 and 635 is performed: the changes to the control data can be either rolled back or completed, depending on the situation. The structure of the system is such that the control data can be put in a consistent state one way or the other; the control data are not left in an inconsistent state.

The following discussion is intended to provide a brief, general description of a suitable machine in which certain aspects of the invention may be implemented. Typically, the machine includes a system bus to which are attached processors, memory, e.g., random access memory (RAM), read-only memory (ROM), or other state preserving media, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc., which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments, other configurations are contemplated. In particular, even though expressions such as "in one embodiment" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A computer-based apparatus, comprising:
   a system including a server supporting simultaneous access by a first client application and a second client application to managed data of the server, the server including a processor, wherein:
   each of the first client application and the second client application operate as a directly connected client model wherein the first client application and the second client application are each linked to an executable server library on the server that supports the first client application and the second client application accessing the managed data via modifying control data of the server,
   each of the first client application and the second client application and at least parts of the executable server library are executed as a respective same process,
   the managed data is a collection of data items accessed by the first client application and the second client application stored in a main memory on the server,
   the control data controls concurrency, permission and access to the managed data, and the control data comprises state information separate from the data items in the managed data and used by critical sections of the executable server library, where a failure or unexpected exit of the first client application or the second client application leave the control data in an inconsistent partially modified state that prevents the executable server library from rolling back the managed data to a consistent state prior to the failure or unexpected exit of the first client application or second client application;
   an oplog generator to generate oplogs, the oplogs storing information about changes in the control data while the first client application is operating within the critical sections of the server library but fails to finish all necessary changes to the control data; and
   an oplog cleaner process configured to use the oplogs to perform a first operation that undoes the changes in the control data made by the first client application or second client application prior to the failure or unexpected exit of the first client application or second client application and before completing one of the critical sections of the executable server library, wherein undoing the changes in the control data enable the oplog cleaner to then conduct a second roll back operation where the oplog cleaner then uses a second roll back log separate from the oplogs to separately roll back the data items in the managed data to a state prior to the failure or unexpected exit of the first client application or second client application from the executable server library.

2. The computer-based apparatus according to claim 1, wherein the critical sections start when a synchronization primitive is acquired and end when the synchronization primitive is released, and the oplog cleaner process uses the information stored in the oplogs to undo the change in the control data.

3. The computer-based apparatus according to claim 2, wherein:
   the oplogs include a partially modified linked list; and
   the oplog cleaner process uses the information stored in the oplogs to convert the partially modified link list back into an original non-modified linked list.

4. The computer-based apparatus according to claim 2, wherein the oplogs include:
   a first list identifier to identify a first list;
   a second list identifier to identify a second list;
   an element identifier identifying an element to be moved from the first list to the second list;
   a first next element identifier identifying a next element in the first list; and
   a second next element identifier identifying a next element in the second list.

5. The computer-based apparatus according to claim 1, further comprising a connection monitor daemon operating on the server and configured to:
   grant direct connections between the first client application and the second client application on the terminals with the executable server library on the server;
   open sockets with the first client application and the second client application; and
   monitor the sockets between the server and the first client application and the second client application.

6. The computer-based apparatus according to claim 5, wherein the connection monitor daemon is operative to:
   detect when one of the sockets has been unexpectedly closed; and launch the oplog cleaner process upon detection of a failure of one of the first client application and the second client application.

7. The computer-based apparatus according to claim 1, wherein the information about the changes to the control data stored in the oplogs includes values associated with table creation, index creation, and cursor operations.

8. The computer-based apparatus according to claim 1, wherein the database system is an in-memory database system.

9. The computer-based apparatus according to claim 1 wherein the information about the changes to the control data stored in the oploas includes instructions that leave tables in an open state and that move elements between lists.

10. The computer-based apparatus according to claim 1, wherein the information stored in the oplogs includes metadata values associated with a structure of a database containing the data items and state information about currently open client actions performed by the first and second client applications.

11. The computer-based apparatus according to claim 2, wherein the synchronization primitive comprises a lock.

12. A computer-based apparatus comprising:
a system including a server supporting simultaneous access by a first client and a second client, the server including a processor, wherein:
each of said first client and said second client operating as a directly connected client model wherein applications executed by the first and second client are linked to an executable library on the server that supports said first and second client applications modifying control data on the server,
the applications on the first and second clients and at least parts of the executable library on the server linked to the applications are executed as a same process,
the server has associated managed data that is a collection of data items accessed by the same process executed by the applications on the first and second clients and the linked part of the executable library on the server,
the control data controls concurrency, permission and access to the managed data on the server, and the control data includes a synchronization primitive configured to manage access of the first client and the second client to the managed data, and
the control data for the server includes critical sections where a failure or unexpected exit of the first client or second client leave the control data in an inconsistent partially modified state;
an oplog generator to generate oplogs for the critical sections of the control data, the oplogs storing information about changes in the control data while the application for said first client is operating within the critical sections of the control data, wherein the oplog generator is further configured to generate managed data logs separately from the oplogs that store changes to the data items in the managed data independently of the changes in the control data stored in the oplogs;
an oplog cleaner process to complete or reverse said critical sections of the control data of the server upon determination that said first client failed before completing said changes to the critical sections of the control data; and
wherein the oplog cleaner process uses the oplogs to perform a first operation that undoes the changes in the control data made by the first client or second client prior to completing said changes to the critical sections of the control data, and
wherein the oplog cleaner, after undoing the changes in the control data, then conducts a second separate roll back operation where the oplog cleaner uses a second managed data log separate from the oplogs to separately roll back the data items in the managed data to a state prior to the first client or second client completing said changes to the critical sections of the control data.

13. The computer-based apparatus according to claim 12, wherein the oplogs include:
a list identifier;
a length for a list identified by the list identifier; and
an operation to be performed iteratively on the list.

14. A method for operating a computer system, comprising:
configuring a client computer to directly attach to a server in the database system such that the database system executes a client application of the client computer and at least a portion of the database system in a single process, wherein:
the client application is linked to an executable server library that supports the client application accessing managed data of the server via modifying control data of the server,
the managed data is a collection of data items accessed by the client application,
the control data controls concurrency, permission and access to the managed data,
the executable server library includes critical sections where a failure or unexpected exit of the client application leaves the control data in an inconsistent partially modified state;
maintaining, via the executable server library, the control data to manage the accessing of the managed data by the client application;
logging changes to the control data while the client application is operating within the critical sections;
separately logging changes to the data items in the managed data;
monitoring for a failure of the client application;
in response to detection of the failure of the client application, undoing the logged changes made to the control data by the client application while operating within the critical sections of the executable server library prior to the failure or unexpected exit of the client application; and
after undoing the logged changes made to the control data, conducting a second separate roll back operation to separately roll back the logged changes made to the data items in the managed data by the client application prior to the failure or unexpected exit of the client application from the executable server library.

15. The method according to claim 14, wherein:
the method further comprises configuring a second client computer to directly attach to the system; and
the repairing the control data includes, repairing the control data in response to detection of the failure of the client application without disconnecting the second client computer from the system.

16. The method according to claim 14, wherein the logging changes to the control data includes:
maintaining a list of open transactions;
associating each one of one or more open transactions in the list of open transactions with a respective cursor; and
associating each of the respective cursors with a respective table in the system, the respective table to be modified as part of the one of the open transactions associated with the respective cursor.

17. The method according to claim 16, wherein, for a particular one of the open transactions, the repairing the control data includes:
    removing a first association between the respective cursor and the respective table, upon determination that the first association exists; and
    removing a second association between the particular open transaction and the respective cursor, upon determination that the second association exists.

18. The method according to claim 14, wherein the logging changes to the control data includes:
    identifying a list in the control data being changed in response to the client application accessing the managed data;
    identifying an operation to be performed by the executable server library on an element in the list; and
    storing information to enable undoing the operation to be performed by the executable server library on the element.

19. The method according to claim 18, wherein the identifying an operation includes identifying the element to be added to the list.

20. The method according to claim 18, wherein the identifying an operation includes identifying the element to be removed from the list.

21. The method according to claim 20, wherein the repairing the control data includes:
    identifying the element to be removed as a hole in the list; and
    iteratively moving the hole until the list is continuous.

22. The method according to claim 18, wherein the identifying an operation includes identifying the element to be moved within the list.

23. The method according to claim 18, wherein the repairing the control data includes restoring the element to an original state.

24. The method according to claim 14, wherein the logging changes to the control data includes:
    identifying a list in the control data being changed in response to the client application accessing the managed data;
    identifying an operation to be performed by the executable server library on elements in the list; and
    storing information about the operation.

25. The method according to claim 24, wherein the repairing the control data includes:
    identifying elements to which the executable server library has not performed the operation; and
    iteratively performing the operation on the identified elements.

26. The method according to claim 25, wherein:
    the identifying an operation includes identifying a hole move operation to be performed by the client computer on the elements in the list; and
    the iteratively performing the operation on the identified elements includes iteratively moving a hole past the identified elements until the list is continuous.

27. The method according to claim 14, wherein:
    the configuring a client computer to directly attach to the server includes configuring the client computer to directly attach to a database system;
    the logging changes to the control data includes logging changes to a control structure of the database system in response to the client application accessing the managed data; and
    the repairing the control data includes repairing the control structure of the database system while maintaining an availability of the database system.

28. The method according to claim 27, wherein:
    the configuring the client computer to directly attach to a database system includes configuring the client computer to directly attach to an in-memory database system;
    the logging changes to the control data includes logging changes to a control structure of the in-memory database system in response to the client application accessing the managed data; and
    the repairing the control data includes repairing the control structure of the in-memory database system while maintaining an availability of the in-memory database system.

29. An article comprising a computer-readable memory having associated data stored thereon, wherein the data, when accessed, results in a computer performing operations comprising:
    configuring a client to directly attach to a server in a system such that a client application of the client and an executable server library execute as a single process, wherein:
    the client application is linked to the executable server library, the executable server library to support the client application accessing managed data of the server via modifying control data of the server,
    the managed data is a collection of data items accessed by the client application,
    the control data controls concurrency, permission and access to the managed data, and the control data includes a synchronization primitive configured to manage access of the client application to the managed data, and
    the executable server library includes critical sections where a failure or unexpected exit of the client application leaves the control data in an inconsistent partially modified state;
    maintaining, via the executable server library, the control data to manage the accessing of the managed data by the client application;
    logging changes to the control data while the client application is operating within the critical sections;
    monitoring for a failure of the client application;
    undoing the changes made to the control data by the client application while operating within the critical sections of the executable server library prior to the failure or unexpected exit of the client application from the executable server library; and
    conducting a second separate roll back operation after undoing the changes made to the control data to separately roll back changes in the data items in the managed data made by the client application prior to the failure or unexpected exit of the client application from the executable server library.

30. The article according to claim 29, wherein:
    the operations further comprise configuring a second client to directly attach to the system; and
    the repairing the control data includes repairing the control data in response to detection of the failure of the client application without disconnecting the second client from the system.

31. The article according to claim 29, wherein the logging changes to the control data includes:
    maintaining a list of open transactions;
    associating each one of one or more open transactions in the list of open transactions with a respective cursor; and associating each of the respective cursors with a respective table in the system, the respective table to be modified as part of the one of the open transactions associated with the respective cursor.

32. The article according to claim 31, wherein, for a particular one of the open transactions, the repairing the control data includes:
removing a first association between the respective cursor and the respective table, upon determination that the first association exists; and
removing a second association between the particular open transaction and the respective cursor, upon determination that the second association exists.

33. The article according to claim 29, wherein the logging changes to the control data includes:
identifying a list in the control data being changed in response to the client application accessing the managed data;
identifying an operation to be performed by the executable server library on an element in the list; and
storing information to enable undoing the operation to be performed by the executable server library on the element.

34. The article according to claim 33, wherein the identifying an operation includes identifying the element to be added to the list.

35. The article according to claim 33, wherein the identifying an operation includes identifying the element to be removed from the list.

36. The article according to claim 35, wherein the repairing the control data includes:
identifying the element to be removed as a hole in the list; and
iteratively moving the hole until the list is continuous.

37. The article according to claim 33, wherein the identifying an operation includes identifying the element to be moved within the list.

38. The article according to claim 33, wherein the repairing the control data includes restoring the element to an original state.

39. The article according to claim 29, wherein the logging changes to the control data includes:
identifying a list in the control data being changed in response to the client application accessing the managed data;
identifying an operation to be performed by the executable server library on elements in the list; and
storing information about the operation.

40. The article according to claim 39, wherein the repairing the control data includes:
identifying elements to which the executable server library has not performed the operation; and
iteratively performing the operation on the identified elements.

41. The article according to claim 40, wherein:
the identifying an operation includes identifying a hole move operation to be performed by the client on the elements in the list; and
the iteratively performing the operation on the identified elements includes iteratively moving a hole past the identified elements in the list until the list is continuous.

42. The article according to claim 29, wherein:
the configuring a client to directly attach to the server includes configuring the client to directly attach to a database system;
the logging changes to the control data includes logging changes to a control structure of the database system in response to the client application accessing the managed data; and
the repairing the control data includes repairing the control structure of the database system while maintaining an availability of the database system.

43. The article according to claim 29, wherein:
the configuring the client to directly attach to a database system includes configuring the client to directly attach to an in-memory database system;
the logging changes to the control data includes logging changes to a control structure of the in-memory database system in response to the client application accessing the managed data; and
the repairing the control data includes repairing the control structure of the in-memory database system while maintaining an availability of the in-memory database system.

* * * * *

UNITED STATES PATENT AND TRADEMARK OFFICE
CERTIFICATE OF CORRECTION

PATENT NO. : 7,739,244 B2  
APPLICATION NO. : 10/966285  
DATED : June 15, 2010  
INVENTOR(S) : Sanjay Verma et al.

Page 1 of 1

It is certified that error appears in the above-identified patent and that said Letters Patent is hereby corrected as shown below:

On the face page, in field (56), in column 2, under "Other Publications", line 1, delete "Backup" and insert -- Backup Copy --, therefor.

On the face page, in field (57), in column 2, in "Abstract", line 8, delete "upon" and insert -- on --, therefor.

In column 4, line 9, delete "modem" and insert -- modern --, therefor.

In column 11, line 46, delete "CPU))," and insert -- (CPU)), --, therefor.

In column 12, line 2-3, delete "can server without specifically being" and insert -- can serve without being specifically --, therefor.

In column 19, line 13, in claim 9, delete "oploas" and insert -- oplogs --, therefor.

Signed and Sealed this
Twelfth Day of July, 2011

David J. Kappos
*Director of the United States Patent and Trademark Office*